US007768681B2

(12) United States Patent
Kuwata

(10) Patent No.: US 7,768,681 B2
(45) Date of Patent: Aug. 3, 2010

(54) IMAGE PROCESSING DEVICE AND METHOD OF IMAGE PROCESSING

(75) Inventor: Naoki Kuwata, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1123 days.

(21) Appl. No.: 10/937,107

(22) Filed: Sep. 8, 2004

(65) Prior Publication Data

US 2005/0140993 A1 Jun. 30, 2005

(30) Foreign Application Priority Data

Sep. 9, 2003 (JP) ............................. 2003-316125
Sep. 9, 2003 (JP) ............................. 2003-316897

(51) Int. Cl.
G06K 15/00 (2006.01)
G06K 9/00 (2006.01)
G06K 9/40 (2006.01)
G06K 1/00 (2006.01)
G06F 15/00 (2006.01)
G03F 3/08 (2006.01)
H04N 1/40 (2006.01)
H04N 1/387 (2006.01)
G09G 5/00 (2006.01)
G09G 5/02 (2006.01)

(52) U.S. Cl. ................ 358/518; 358/1.18; 358/1.9; 358/1.6; 358/520; 358/522; 358/448; 358/450; 345/581; 345/589; 345/619; 382/167; 382/168; 382/254

(58) Field of Classification Search ............... 358/1.2, 358/1.9, 2.1, 3.2, 3.22, 3.24, 518, 520, 528, 358/1.18, 522, 448, 450; 382/167, 165, 164, 382/209, 217, 274, 266, 286, 291, 307, 166, 382/168, 254; 345/581, 589, 619
See application file for complete search history.

(56) References Cited

U.S. PATENT DOCUMENTS 5,136,401 A * 8/1992 Yamamoto et al. .......... 358/474

(Continued)

FOREIGN PATENT DOCUMENTS

DE 197 32 241 2/1998

(Continued)

OTHER PUBLICATIONS

Yu-ichi Ohta et al., "Color Information for Region Segmentation," *Computer Graphics and Image Processing*, vol. 13, No. 3, Jul. 1980, pp. 222-241 (XP008026458).

(Continued)

*Primary Examiner*—Twyler L Haskins
*Assistant Examiner*—Jonathan R Beckley
(74) *Attorney, Agent, or Firm*—Martine Penilla & Gencarella, LLP

(57) ABSTRACT

A CPU 200 obtains and analyzes one or multiple image data GD, which are to be laid out on ornamental image data FD. The CPU 200 also obtains and analyzes desired ornamental image data FD to acquire a color distribution characteristic (representative color Fc). The CPU 200 sets an analyzed correction level according to the result of the analysis of the image data GD and modifies the analyzed correction level based on the acquired color distribution characteristic, so as to set a modified color balance correction level. The CPU 200 adjusts the color balance of the image data GD with the modified color balance correction level and pastes the color balance-adjusted image data GD onto the ornamental image data FD according to layout control information LI to generate output image data.

6 Claims, 10 Drawing Sheets

U.S. PATENT DOCUMENTS

| | | | |
|---|---|---|---|
| 5,157,516 A * | 10/1992 | Bachar | 358/451 |
| 5,189,529 A * | 2/1993 | Ishiwata et al. | 358/451 |
| 5,459,589 A * | 10/1995 | Ohnishi et al. | 358/518 |
| 5,459,819 A * | 10/1995 | Watkins et al. | 358/1.18 |
| 5,469,536 A * | 11/1995 | Blank | 345/594 |
| 5,539,523 A * | 7/1996 | Nakai et al. | 358/296 |
| 5,581,377 A * | 12/1996 | Shimizu et al. | 358/540 |
| 5,594,850 A * | 1/1997 | Noyama et al. | 345/632 |
| 5,687,297 A * | 11/1997 | Coonan et al. | 358/1.2 |
| 5,778,164 A * | 7/1998 | Watkins et al. | 358/1.18 |
| 5,966,461 A * | 10/1999 | Harrington | 382/167 |
| 6,058,207 A * | 5/2000 | Tuijn et al. | 382/162 |
| 6,188,490 B1 * | 2/2001 | Miyake | 358/1.18 |
| 6,301,013 B1 * | 10/2001 | Momose et al. | 358/1.15 |
| 6,330,353 B1 * | 12/2001 | Lai et al. | 382/147 |
| 6,362,901 B1 * | 3/2002 | Passman et al. | 358/453 |
| 6,370,568 B1 * | 4/2002 | Garfinkle | 358/1.18 |
| 6,373,591 B1 * | 4/2002 | Seaman et al. | 358/1.18 |
| 6,441,850 B1 * | 8/2002 | Dotsubo et al. | 382/209 |
| 6,459,419 B1 * | 10/2002 | Matsubayashi | 345/156 |
| 6,473,196 B2 * | 10/2002 | Usami et al. | 358/1.18 |
| 6,556,311 B1 * | 4/2003 | Benear et al. | 358/1.9 |
| 6,577,760 B1 * | 6/2003 | Ohta et al. | 382/167 |
| 6,650,778 B1 * | 11/2003 | Matsugu et al. | 382/209 |
| 6,674,485 B2 | 1/2004 | Akiyama et al. | |
| 6,678,070 B1 * | 1/2004 | Seaman et al. | 358/1.18 |
| 6,697,537 B2 * | 2/2004 | Norimatsu | 382/275 |
| 6,727,909 B1 * | 4/2004 | Matsumura et al. | 345/629 |
| 6,791,711 B1 * | 9/2004 | Uekusa et al. | 358/1.9 |
| 6,822,756 B1 * | 11/2004 | Cok et al. | 358/1.9 |
| 6,898,312 B2 * | 5/2005 | Schroder | 382/167 |
| 6,956,671 B2 * | 10/2005 | Monty et al. | 358/1.9 |
| 6,975,418 B1 * | 12/2005 | Ohta et al. | 358/1.15 |
| 7,010,176 B2 * | 3/2006 | Kusunoki | 382/299 |
| 7,065,249 B2 * | 6/2006 | Fushiki et al. | 382/167 |
| 7,079,284 B2 * | 7/2006 | Kawakami et al. | 358/1.9 |
| 7,136,103 B2 * | 11/2006 | Oeda et al. | 348/333.02 |
| 7,148,990 B2 * | 12/2006 | Atkins et al. | 358/1.18 |
| 7,173,654 B2 * | 2/2007 | Kurokawa | 348/223.1 |
| 7,222,306 B2 * | 5/2007 | Kaasila et al. | 715/801 |
| 7,256,911 B2 * | 8/2007 | Takabayashi et al. | 358/1.9 |
| 7,258,498 B2 * | 8/2007 | Hatta et al. | 400/62 |
| 7,336,387 B2 * | 2/2008 | Nakami et al. | 358/1.16 |
| 2002/0080251 A1 * | 6/2002 | Moriwaki | 348/232 |
| 2002/0164085 A1 * | 11/2002 | Norimatsu | 382/275 |
| 2003/0123073 A1 * | 7/2003 | Ohta et al. | 358/1.9 |

FOREIGN PATENT DOCUMENTS

| | | |
|---|---|---|
| EP | 1 085 464 | 3/2001 |
| JP | 08-195968 | 7/1996 |
| JP | 10-208034 | 8/1998 |
| JP | 10-271524 | 10/1998 |
| JP | 11-328403 | 11/1999 |
| JP | 2000-092306 | 3/2000 |
| JP | 2000-165647 | 6/2000 |
| JP | 2000-216973 | 8/2000 |
| JP | 2002-111995 | 4/2002 |
| JP | 2003-030670 | 1/2003 |
| JP | 2004-007770 | 1/2004 |

OTHER PUBLICATIONS

Nihan Coskun and Tulay Yildirim, "The Effects of Training Algorithms in MLP Network on Image Classification," *Proceedings of the Int'l Joint Conference on Neural Networks*, vol. 4, Jul. 20, 2003, pp. 1223-1226 (XP010652644).

Abstract of Japanese Patent Publication No. 10-208034, Pub. Date: Aug. 7, 1998, Patent Abstracts of Japan.

Abstract of Japanese Patent Publication No. 10-271524, Pub. Date: Oct. 9, 1998, Patent Abstracts of Japan.

Abstract of Japanese Patent Publication No. 11-328403, Pub. Date: Nov. 30, 1999, Patent Abstracts of Japan.

Abstract of Japanese Patent Publication No. 2000-165647, Pub. Date: Jun. 16, 2000, Patent Abstracts of Japan.

Abstract of Japanese Patent Publication No. 08-195968, Pub. Date: Jul. 30, 1996, Patent Abstracts of Japan.

Abstract of Japanese Patent Publication No. 2000-092306, Pub. Date: Mar. 31, 2000, Patent Abstracts of Japan.

Abstract of Japanese Patent Publication No. 2000-216973, Pub. Date: Aug. 4, 2000, Patent Abstracts of Japan.

Abstract of Japanese Patent Publication No. 2002-111995, Pub. Date: Apr. 12, 2002, Patent Abstracts of Japan.

Abstract of Japanese Patent Publication No. 2003-030670 Pub. Date: Jan. 31, 2003, Patent Abstracts of Japan.

Abstract of Japanese Patent Publication No. JP 2004-007770, Pub Date: Jan. 8, 2004, Patent Abstracts of Japan.

* cited by examiner

IMAGE PROCESSING DEVICE AND METHOD OF IMAGE PROCESSING

BACKGROUND OF THE INVENTION

1. Field of Technology

The present invention relates to a technique of executing series of image processing with regard to objective image data, which has a layout location and layout dimensions relative to ornamental image data specified by layout control information.

2. Description of the Related Art

There are some practical techniques of pasting objective image data, for example, image data taken by an imaging device, on ornamental image data, for example, frame image data, to output a resulting output image including an objective image surrounded by an ornamental image on a medium, such as paper. This technique uses layout control information including a script that describes a layout location and layout dimensions of the objective image data laid out on the ornamental image data.

The layout control information is related to the ornamental image data. In response to the user's selection and layout of objective image data on ornamental image data, this technique pastes the objective image data resized to preset dimensions at a preset location in the ornamental image data and thereby generates a resulting output image including the objective image surrounded by the ornamental image.

The prior art technique, however, does not execute image quality adjustment of the objective image data to be laid out on the ornamental image data by taking into account the image quality characteristics of the ornamental image data, for example, the brightness, the luminance, and the color tone. This may result in inadequate color contrast between the ornamental image data and the objective image data.

SUMMARY OF THE INVENTION

The object of the invention is thus to eliminate the drawbacks of the prior art and adjust the color balance of objective image data to attain an adequate color contrast between the objective image data and ornamental image data. The object of the invention is also to adjust the color balance of objective image data to attain an adequate luminance contrast between the objective image data and ornamental image data.

In order to attain at least part of the above and the other related objects, a first aspect of the invention is directed to an image processing device that executes image processing of objective image data, which is to be laid out on ornamental image data. The image processing device of the first aspect of the invention includes: an ornamental image data acquisition module that obtains the ornamental image data; an objective image data acquisition module that obtains the objective image data, which is to be laid out on a layout location of the ornamental image data; a layout control information acquisition module that obtains layout control information, which is related to the obtained ornamental image data and specifies a layout location and layout dimensions of the objective image data to be laid out on the ornamental image data; an ornamental image color distribution characteristic acquisition module that acquires a color distribution characteristic of the obtained ornamental image data; an image quality adjustment module that adjusts a color balance of the objective image data, based on the acquired color distribution characteristic; and an output image data generation module that generates output image data from the color balance-adjusted objective image data and the ornamental image data according to the layout control information.

The image processing device of the first aspect of the invention adjusts the color balance of the objective image data, based on the color distribution characteristic of the obtained ornamental image data. This arrangement ensures adjustment of the color balance of the objective image data to attain an adequate color contrast between the objective image data and the ornamental image data.

In the image processing device as the first aspect of the invention, the image quality adjustment module may adjust the color balance of the objective image data to enhance a color contrast between the ornamental image data and the objective image data. The image quality adjustment module may otherwise adjust the color balance of the objective image data to lower a color contrast between the ornamental image data and the objective image data. The former arrangement generates output image data with a high color contrast between an objective image and an ornamental image, thereby giving the objective image sufficiently highlighted against the ornamental image. The latter arrangement generates output image data with a low color contrast between an objective image and an ornamental image, thereby giving the objective image in good harmony with (having a similar color tendency to) the ornamental image.

In one preferable embodiment of the first aspect of the invention, the image processing device further includes: an analyzed correction level setting module that analyzes the objective image data, which is to be laid out on the ornamental image data, and sets an analyzed correction level relating to the color balance; and a modified color balance correction level setting module that modifies the analyzed correction level based on the acquired color distribution characteristic, so as to set a modified color balance correction level. The image quality adjustment module adjusts the color balance of the objective image data with the modified color balance correction level. The structure of this embodiment sets the analyzed correction level according to the result of the analysis of the objective image data and modifies the analyzed correction level based on the color distribution characteristic of the ornamental image data to set the modified color balance correction level. The color balance of the objective image data is adjusted to a desired level with the modified color balance correction level. This arrangement adjusts the color balance of the objective image data to the adequate level and also attains the adequate color contrast between the ornamental image data and the objective image data.

In the image processing device as the first aspect of the invention, the modified color balance correction level setting module may modify the analyzed correction level and set the modified color balance correction level to enhance a color contrast between the ornamental image data and the objective image data. The modified color balance correction level setting module may otherwise modify the analyzed correction level and set the modified color balance correction level to lower a color contrast between the ornamental image data and the objective image data. The former arrangement generates output image data with a high color contrast between an objective image and an ornamental image, thereby giving the objective image sufficiently highlighted against the ornamental image. The latter arrangement generates output image data with a low color contrast between an objective image and an ornamental image, thereby giving the objective image in good harmony with (having a similar color tendency to) the ornamental image.

In one preferable embodiment of the image processing device as the first aspect of the invention, the ornamental image color distribution characteristic acquisition module analyzes the ornamental image data to acquire the color distribution characteristic of the ornamental image data. This arrangement ensures adjustment of the image quality of the objective image data to attain an adequate color contrast between the objective image data and arbitrary ornamental image data.

In another preferable embodiment of the image processing device as the first aspect of the invention, the layout control information includes the color distribution characteristic of the ornamental image data, and the ornamental image color distribution characteristic acquisition module reads the color distribution characteristic of the ornamental image data from the layout control information. This arrangement ensures easy and quick adjustment of the image quality of the objective image data to attain an adequate color contrast.

A second aspect of the invention is directed to an image processing method that executes image processing of objective image data, which is to be laid out on ornamental image data. The image processing method of the second aspect of the invention includes the steps of: obtaining the ornamental image data; obtaining the objective image data, which is to be laid out on a layout location of the ornamental image data; obtaining layout control information, which is related to the obtained ornamental image data and specifies a layout location and layout dimensions of the objective image data to be laid out on the ornamental image data; acquiring a color distribution characteristic of the obtained ornamental image data; adjusting a color balance of the objective image data, based on the acquired color distribution characteristic; and generating output image data from the color balance-adjusted objective image data and the ornamental image data according to the layout control information.

The image processing method as the second aspect of the invention has similar functions and effects to those of the image processing device as the first aspect of the invention. The diverse arrangements of the image processing device as the first aspect of the invention are also applicable to the image processing method as the second aspect of the invention.

In order to attain at least part of the objects and the other related objects, a third aspect of the present invention is directed to an image processing device that executes image processing of objective image data, which is to be laid out on ornamental image data. The image processing device of the third aspect of the invention includes: an ornamental image data acquisition module that obtains the ornamental image data; an objective image data acquisition module that obtains the objective image data, which is to be laid out on a layout location of the ornamental image data; a layout control information acquisition module that obtains layout control information, which is related to the obtained ornamental image data and specifies a layout location and layout dimensions of the objective image data to be laid out on the ornamental image data; an ornamental image luminance characteristic acquisition module that acquires a luminance characteristic of the obtained ornamental image data; an image quality adjustment module that adjusts a brightness of the objective image data, based on the acquired luminance characteristic; and an output image data generation module that generates output image data from the brightness-adjusted objective image data and the ornamental image data according to the layout control information.

The image processing device of the third aspect of the invention adjusts the brightness of the objective image data, based on the luminance characteristic of the obtained ornamental image data. This arrangement ensures adjustment of the brightness of the objective image data to attain an adequate luminance contrast between the objective image data and the ornamental image data.

In the image processing device as the third aspect of the invention, the image quality adjustment module may adjust the brightness of the objective image data to enhance a luminance contrast between the ornamental image data and the objective image data. The image quality adjustment module may otherwise adjust the brightness of the objective image data to lower a luminance contrast between the ornamental image data and the objective image data. The former arrangement generates output image data with a high luminance contrast between an objective image and an ornamental image, thereby giving the objective image sufficiently highlighted against the ornamental image. The latter arrangement generates output image data with a low luminance contrast between an objective image and an ornamental image, thereby giving the objective image in good harmony with (having a similar brightness to) the ornamental image.

In one preferable embodiment of the third aspect of the invention, the image processing device further includes: an analyzed correction level setting module that analyzes the objective image data, which is to be laid out on the ornamental image data, and sets an analyzed correction level relating to the brightness; and a modified brightness correction level setting module that modifies the analyzed correction level based on the acquired luminance characteristic, so as to set a modified brightness correction level. The image quality adjustment module adjusts the brightness of the objective image data with the modified brightness correction level. The structure of this embodiment sets the analyzed correction level according to the result of the analysis of the objective image data and modifies the analyzed correction level based on the luminance characteristic of the ornamental image data to set the modified brightness correction level. The brightness of the objective image data is adjusted to a desired level with the modified brightness correction level. This arrangement adjusts the brightness of the objective image data to the adequate level and also attains the adequate luminance contrast between the ornamental image data and the objective image data.

In the image processing device as the third aspect of the invention, the modified brightness correction level setting module may modify the analyzed correction level and set the modified brightness correction level to enhance a luminance contrast between the ornamental image data and the objective image data. The modified brightness correction level setting module may otherwise modify the analyzed correction level and set the modified brightness correction level to lower a luminance contrast between the ornamental image data and the objective image data. The former arrangement generates output image data with a high luminance contrast between an objective image and an ornamental image, thereby giving the objective image sufficiently highlighted against the ornamental image. The latter arrangement generates output image data with a low luminance contrast between an objective image and an ornamental image, thereby giving the objective image in good harmony with (having a similar brightness to) the ornamental image.

In one preferable embodiment of the image processing device as the third aspect of the invention, the ornamental image luminance characteristic acquisition module analyzes the ornamental image data to acquire the luminance characteristic of the ornamental image data. This arrangement ensures adjustment of the image quality of the objective image data to attain an adequate luminance contrast between the objective image data and arbitrary ornamental image data.

In another preferable embodiment of the image processing device as the third aspect of the invention, the layout control information includes the luminance characteristic of the ornamental image data, and the ornamental image luminance characteristic acquisition module reads the luminance characteristic of the ornamental image data from the layout control information. This arrangement ensures easy and quick adjustment of the image quality of the objective image data to attain an adequate luminance contrast.

A fourth aspect of the invention is directed to an image processing method that executes image processing of objective image data, which is to be laid out on ornamental image data. The image processing method of the fourth aspect of the invention includes the steps of: obtaining the ornamental image data; obtaining the objective image data, which is to be laid out on a layout location of the ornamental image data; obtaining layout control information, which is related to the obtained ornamental image data and specifies a layout location and layout dimensions of the objective image data to be laid out on the ornamental image data; acquiring a luminance characteristic of the obtained ornamental image data; adjusting a brightness of the objective image data, based on the acquired luminance characteristic; and generating output image data from the brightness-adjusted objective image data and the ornamental image data according to the layout control information.

The image processing method as the fourth aspect of the invention has similar functions and effects to those of the image processing device as the third aspect of the invention. The diverse arrangements of the image processing device as the third aspect of the invention are also applicable to the image processing method as the fourth aspect of the invention.

The image processing methods in the second and the fourth aspects of the invention may also be actualized by corresponding image processing programs and computer readable recording media in which such image processing programs are recorded.

DETAILED DESCRIPTION OF THE PREFERRED EMBODIMENTS

The image processing device and the image processing method of the invention are described below as preferred embodiments with reference to the attached drawings.

First Embodiment

Figure 1:
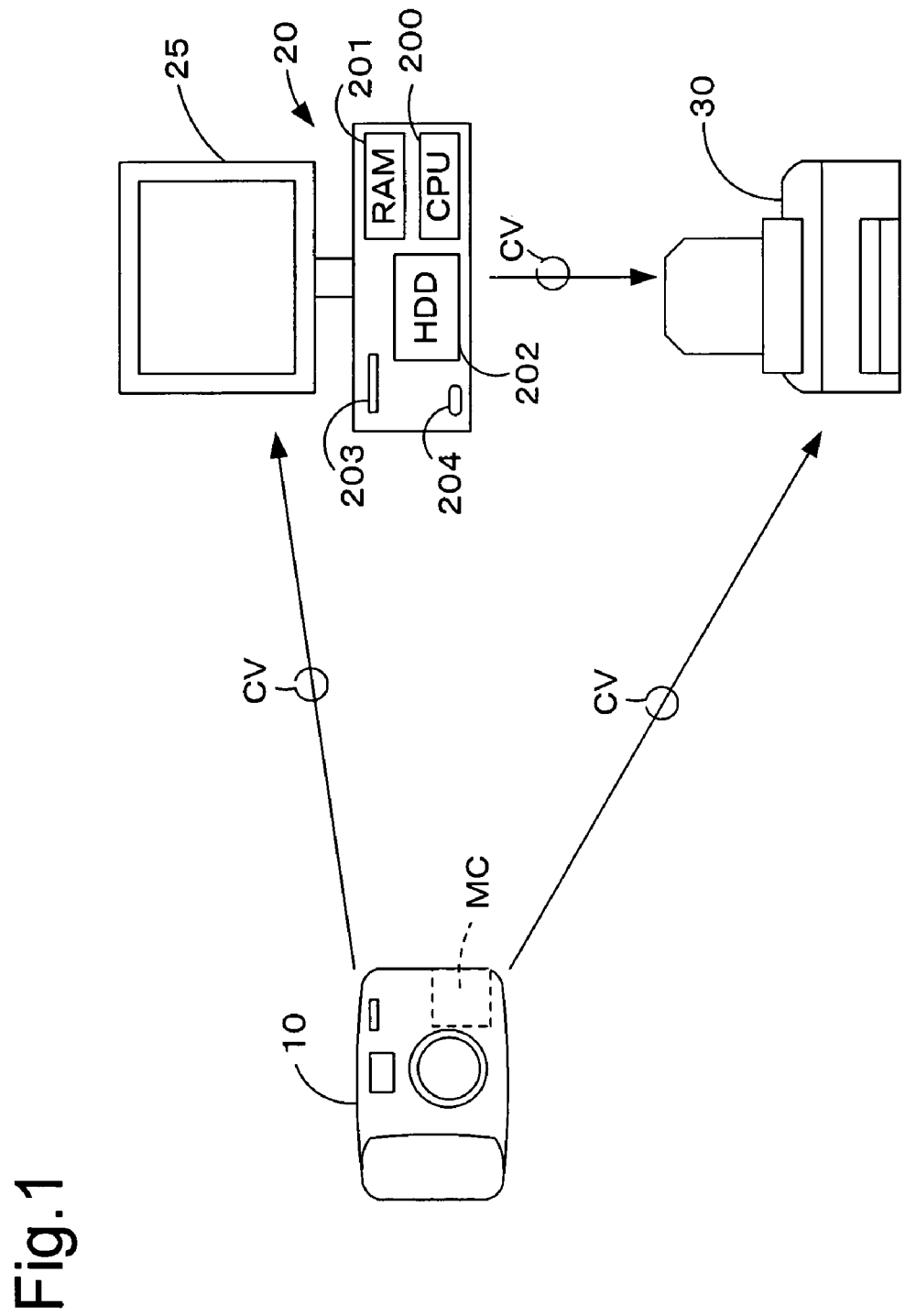
FIG. 1 schematically illustrates the configuration of an image processing system including an image processing device in a first embodiment of the invention.

An image processing system including an image processing device of a first embodiment is described below with reference to FIG. 1. FIG. 1 schematically illustrates the configuration of the image processing system including the image processing device of the first embodiment.

The image processing system includes a digital still camera 10 functioning as an input device to generate image data, a personal computer 20 functioning as the image processing device to execute a series of image processing with regard to input image data generated by the digital still camera 10 and output the processed image data as output image data, and a color printer 30 functioning as an output device to output a processed image corresponding to the output image data. The color printer 30 may have the image processing functions of the personal computer 20. In this case, the stand-alone color printer 30 carries out both the image processing and the image output. The output device is not restricted to the color printer 30 but may be a monitor 25, such as a CRT display or an LCD display, or a projector. In the description below, the color printer 30 connected with the personal computer 20 is used as the output device.

The personal computer 20 is a general computer and includes a central processing unit (CPU) 200 that executes adjustment of color balance and brightness contrast of image data and series of image processing with layout control information LI, a random access memory (RAM) 201 that temporarily stores various data including input image data, and a hard disk drive (HDD) 202 (or a read only memory (ROM)) that stores programs and reference tables for execution of the series of image processing with the layout control information LI. The personal computer 20 additionally has a memory card slot 203 to receive a memory card MC inserted therein and input and output terminals 204 connected with connection cables from, for example, the digital still camera 10.

The digital still camera 10 focuses light information on a digital device (a photoelectric conversion element, such as a CCD or a photoelectron multiplier) to take an image. The digital still camera 10 includes a photoelectric conversion circuit with a CCD to convert light information into electric information, an image acquisition circuit to control the photoelectric conversion circuit and obtain a digital image, and an image processing circuit to process the obtained digital image. The digital still camera 10 stores the obtained digital image in the form of digital image data into the memory card MC as a storage device. The JPEG format for lossy compression storage and the TIFF format for lossless compression storage are typically used to store image data taken by the digital still camera 10, although other storage formats, such as RAW format, GIF format, and BMP format may be adoptable.

The digital still camera 10 writes imaging information, which is set at each time of imaging and describes imaging conditions, and image processing control information GI, which is stored in advance in a memory (for example, a ROM) of the digital still camera 10, into a header of image data in the process of generation of the image data and stores the generated image data into the memory card MC: The digital still camera 10 also stores ornamental image data FD, which gives some design effect to objective image data GD, and layout control information LI, which specifies a layout location and layout dimensions of each objective image data GD to be laid out on the ornamental image data FD and is related to the ornamental image data FD, in its memory and writes the ornamental image data FD and the layout control information LI together with the generated image data into the memory card MC. The ornamental image data FD is, for example, frame image data or album mounting image data on which multiple objective image data are pasted, and may be generated in the form of bitmap data or vector data.

The layout control information LI has a script specifying the layout location and the layout dimensions of each objective image data GD to be laid out on the ornamental image data FD. In the description below, each objective image data specified as a layout object is image data taken by an imaging device. The objective image data of the layout object is, however, not restricted to the image data taken by the imaging device but may be any image data mountable on the ornamental image data FD, for example, image data generated by computer graphics. The layout control information LI may additionally specify representative color information and luminance characteristic information of the ornamental image data FD. The image processing control information GI includes experimentally obtained pieces of information that enables a selected output device to give a desired output result of an image corresponding to image data generated by any selected image data generation device, such as the digital still camera 10. The image processing control information GI includes the settings of respective parameters for specifying image quality adjustment conditions according to the combination of the digital still camera 10 and the selected output device (for example, the printer 30).

The image data generated by the digital still camera 10 is sent to the color printer 30 via a cable CV and the computer 20 or via only a cable CV. An image file of the image data taken by the digital still camera 10 may otherwise be stored in the memory card MC and given to the color printer 30 from the memory card MC, which is inserted into the memory card slot of the personal computer 20 or is directly connected to the color printer 30. In the description below, the personal computer 20 executes a series of image processing with regard to image data and outputs resulting processed image data to the color printer 30.

The color printer 30 is capable of outputting color images and is, for example, an inkjet printer that ejects four color inks, cyan (C), magenta (M), yellow (Y), and black (K), onto a printing medium to create a dot pattern and thereby form an image. The color printer 30 may be an electrophotographic printer that transfers and fixes color toners on a printing medium to form an image. Other color inks, light cyan (LC), light magenta (LM), and dark yellow (DY), may be used in addition to the above four color inks.

B. Image Processing by Personal Computer 20

Figure 2:
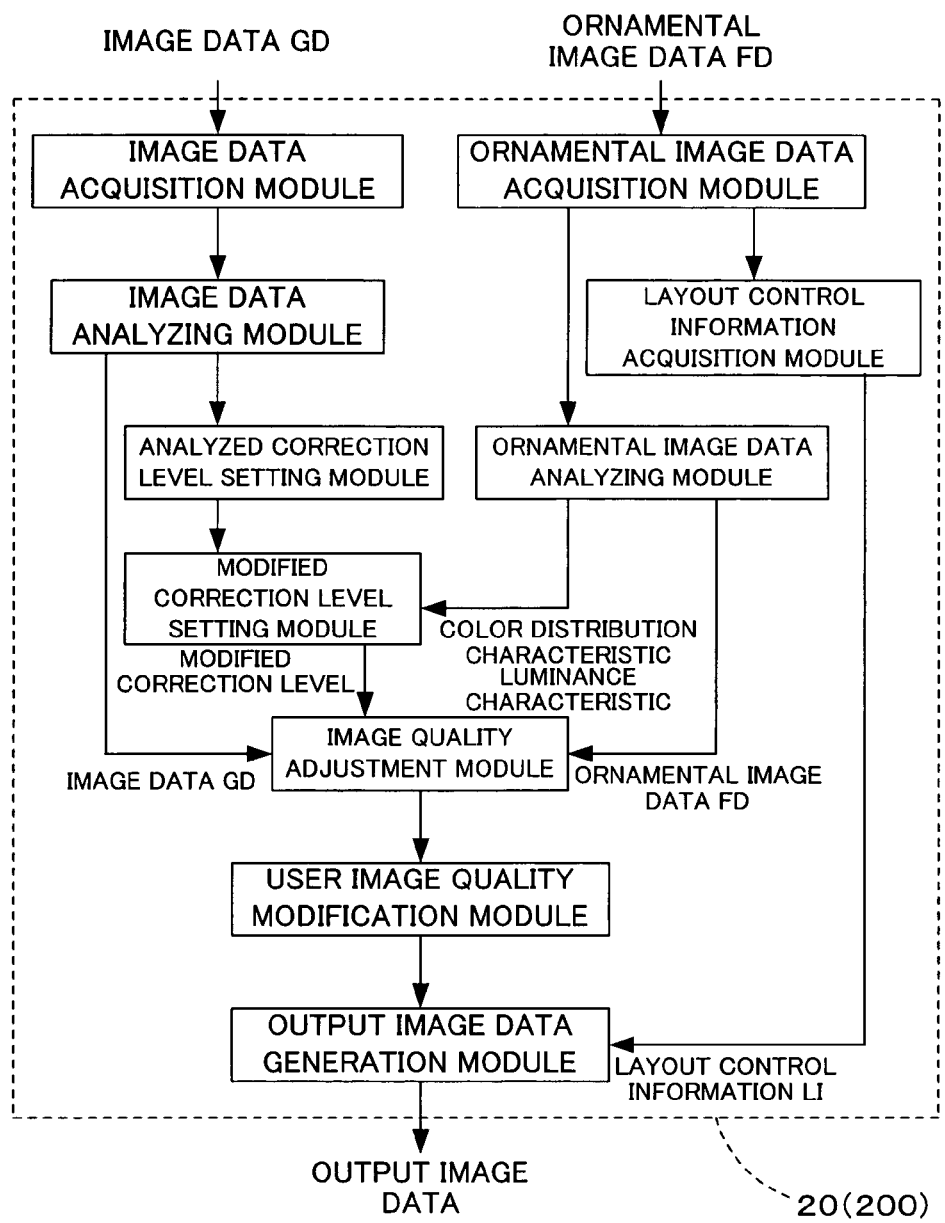
FIG. 2 is a functional block diagram showing the functions of a personal computer 20 (CPU 200) in the first embodiment.

The functional configuration of the personal computer 20 (CPU 200) is described with reference to FIG. 2. FIG. 2 is a functional block diagram showing the functions of the personal computer 20 (CPU 200) in the first embodiment and in a subsequent second embodiment.

In the personal computer 20 (the CPU 200), an image data acquisition module selectively obtains one or multiple image data GD to be pasted on ornamental image data, among plurality of input image data GD. An image data analyzing module analyzes the selected image data GD. In the CPU 200, an ornamental image data acquisition module obtains desired ornamental image data FD, while a layout control information acquisition module obtains layout control information LI related to the obtained ornamental image data FD. An ornamental image data analyzing module analyzes the obtained ornamental image data FD to acquire a luminance characteristic (average luminance Yfm) or a color distribution characteristic (representative color Fc).

In one processing flow, an analyzed correction level setting module included in the CPU 200 sets an analyzed correction level according to the result of the analysis of the selected image data GD. A modified correction level setting module modifies the analyzed correction level based on the acquired color distribution characteristic, so as to set a modified color balance correction level. An image quality adjustment module adjusts the color balance of the image data GD with the modified color balance correction level. An output image data generation module pastes the color balance-adjusted image data GD onto the ornamental image data FD according to the layout control information LI to generate output image data. In the CPU 200, a user image quality modification module may receive a user's request through the operation of a keyboard or an operation panel of the color printer and modify the image quality of the image data GD with the modified color balance correction level, in response to the input request.

In another processing flow, the analyzed correction level setting module included in the CPU 200 sets an analyzed correction level according to the result of the analysis of the selected image data GD. The modified correction level setting module modifies the analyzed correction level based on the acquired luminance characteristic, so as to set a modified brightness correction level. The image quality adjustment module adjusts the brightness of the image data GD with the modified brightness correction level. The output image data generation module pastes the brightness-adjusted image data GD onto the ornamental image data FD according to the layout control information LI to generate output image data. In the CPU 200, the user image quality modification module may receive a user's request through the operation of the keyboard or the operation panel of the color printer and modify the image quality of the image data GD with the modified brightness correction level, in response to the input request.

Figure 3:
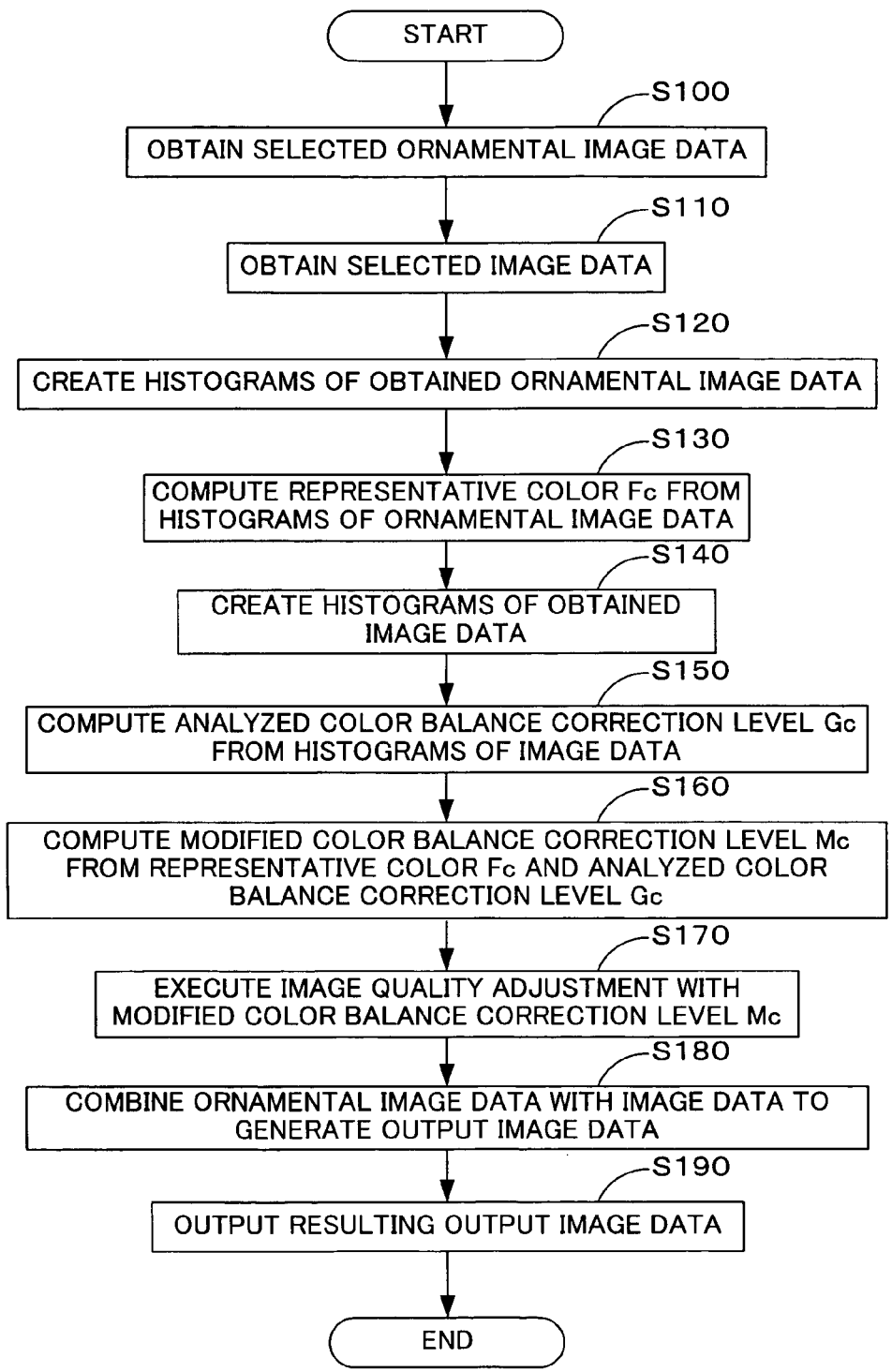
FIG. 3 is a flowchart showing an image processing routine executed by the personal computer 20 in the first embodiment.
Figure 4:
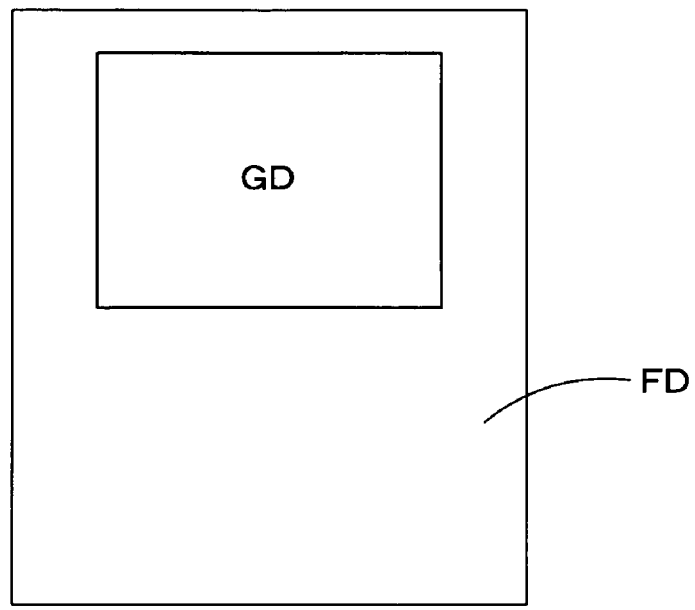
FIG. 4 shows an image of ornamental image data as an example.
Figure 5:
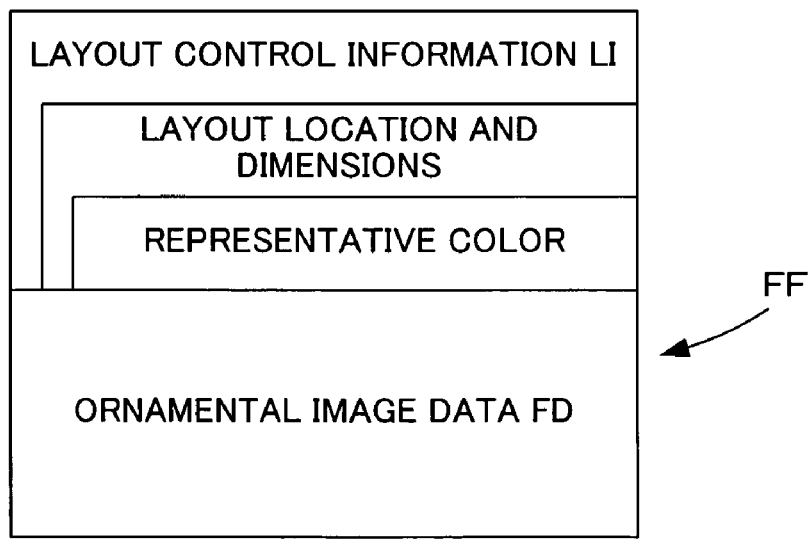
FIG. 5 shows the file structure of an ornamental image file FF including ornamental image data FD and layout control information LI.
Figure 6:
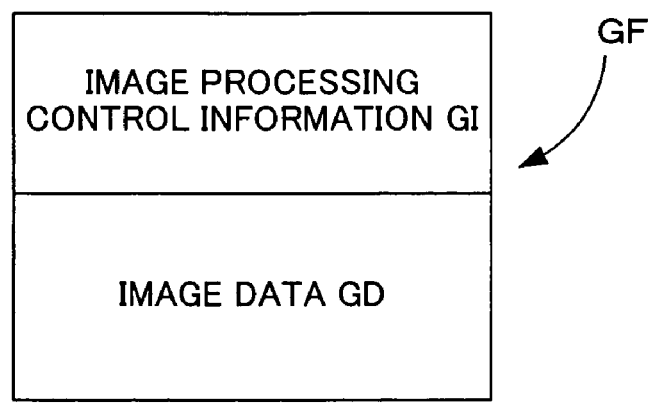
FIG. 6 shows the file structure of an image file including image data GD and image processing control information GI.
Figure 7:
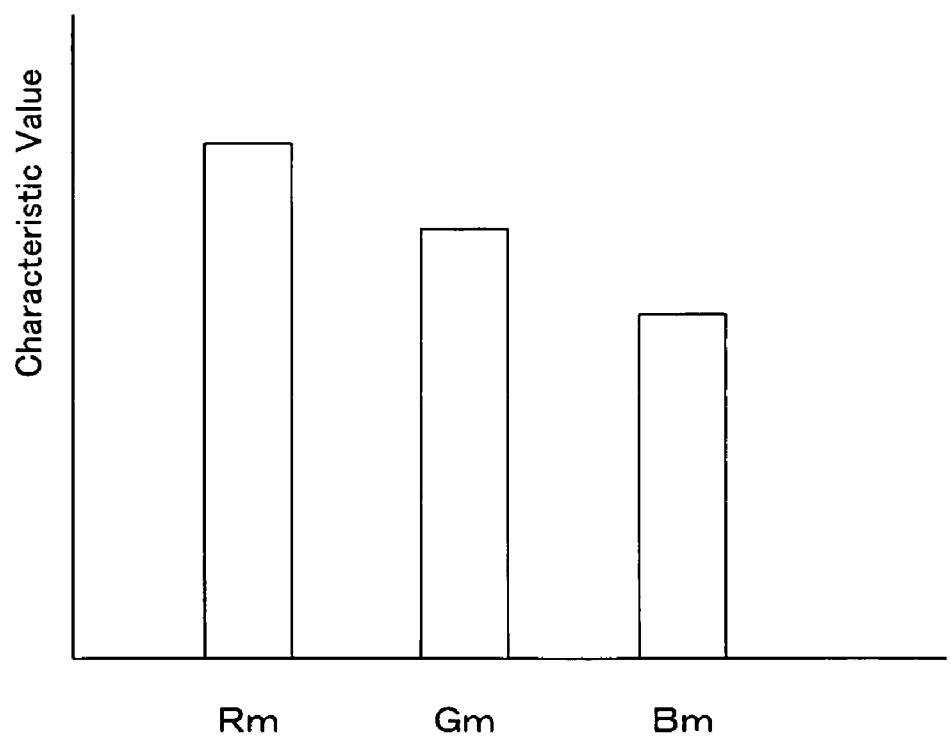
FIG. 7 shows a color distribution characteristic obtained by analyzing the ornamental image data FD.
Figure 8:
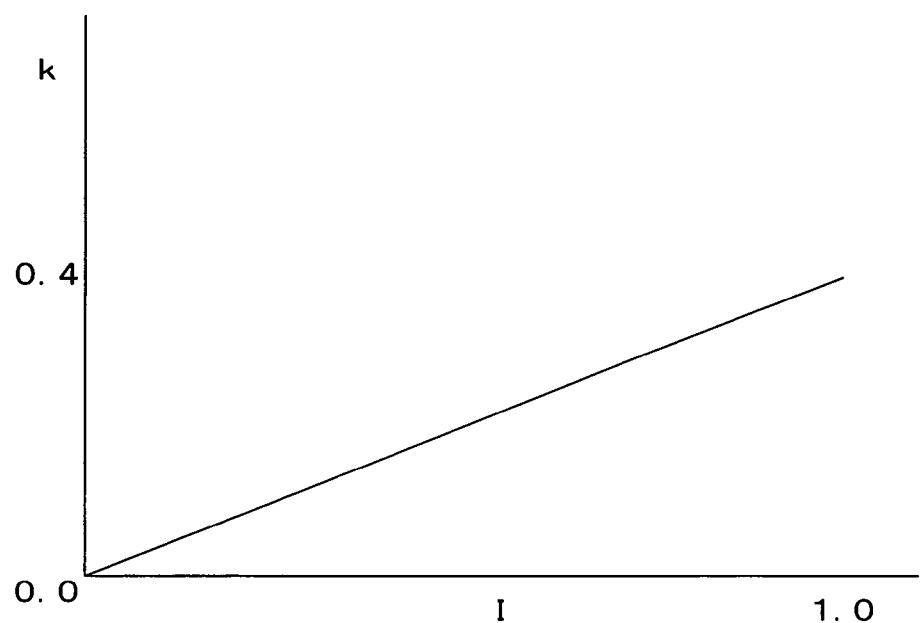
FIG. 8 is a map used to set a modification rate k corresponding to a color distribution characteristic value I of the ornamental image data FD.

A series of image processing executed by the personal computer 20 in the first embodiment is described below with reference to FIGS. 3 through 8. FIG. 3 is a flowchart showing an image processing routine executed by the personal computer 20 in the first embodiment. FIG. 4 shows an image of ornamental image data as an example. FIG. 5 shows the file structure of an ornamental image file FF including ornamental image data FD and layout control information LI. FIG. 6 shows the file structure of an image file including image data GD and image processing control information GI. FIG. 7 shows a color distribution characteristic obtained by analyzing the ornamental image data FD. FIG. 8 is a map used to set a modification rate k corresponding to a color distribution characteristic value I of the ornamental image data FD. The image of the ornamental image data FD conceptually shows the state of expansion on an image buffer. The file structure of each file conceptually shows the state of storage in a memory.

The image processing of this embodiment may be activated by insertion of the memory card MC into the personal computer 20 or by connection of the digital still camera 10 to the personal computer 20 via the communication cable. The image processing may otherwise be triggered by the user's operation of a keyboard to give a start command.

When the image processing starts, the personal computer 20 (CPU 200) first selects ornamental image data FD and temporarily stores the selected ornamental image data FD in the RAM 201 (step S100). The ornamental image data FD may be selected on the digital still camera 10, may be selected among a number of ornamental image data stored in advance in the HDD 202 of the personal computer 20 through the operations of the keyboard, or may be selected via a network. The ornamental image data FD may include plural layout locations to paste multiple image data GD thereon. In this embodiment, however, for the simplicity of explanation, it is assumed that single (one) image data GD is pasted on ornamental image data FD having only one layout location.

The ornamental image data FD has, for example, a form shown in FIG. 4 in a resulting output image (in expansion on an image buffer). The ornamental image data FD has one or multiple layout locations, on which image data GD are respectively pasted.

The ornamental image data FD is transmitted together with the layout control information LI in the form of an ornamental image file FF. The ornamental image file FF has, for example, the file structure of FIG. 5. The layout control information LI includes layout location information (for example, coordinate information) on the layout location to paste image data GD thereon, information regarding the layout dimensions (resized dimensions) of the image data GD on the layout location, and color distribution characteristic information of the ornamental image data FD.

The layout control information LI further includes α channel data, which is used to regulate tone values (R, G, and B tone data) of upper image data (for example, ornamental image data FD) located on an upper side in a resulting composite image relative to those of lower image data (for example, image data GD) located on a lower side and thereby determine the transparency of the lower image data against the upper image data. For example, the α channel data applies a coefficient α to the R, G, and B tone data of the upper image data, while applying a coefficient (1−α) to the R, G, and B tone data of the lower image data. The α channel data set equal to 255 shows no appearance of the lower image data (opaque) in a resulting composite image, whereas the α channel data set equal to 0 shows perfect appearance of the lower image data (transparent) in a resulting composite image. Semi-transparent design effects are given by setting the α channel data in a range of 0 to 255.

The CPU 200 then selects desired image data GD and temporarily stores the selected image data GD into the RAM 201 (step S110). The image data GD may be selected on the digital still camera 10 or on the personal computer 20 through the operations of the keyboard. The typical procedure first selects (determines) desired ornamental image data FD and subsequently selects desired image data to be pasted in the layout location of the ornamental image data GD.

Each image data GD may be related to image processing control information GI to form one image file GF as shown in FIG. 6. The image processing control information GI may be described in a header of the image data GD or may be related to the image data GD by third correlation data.

The CPU 200 analyzes the obtained ornamental image data FD and creates histograms of color distribution characteristic (step S120). The concrete procedure scans multiple pixel data of the ornamental image data FD in units of pixels or at adequate pixel intervals and creates histograms with regard to the respective color components R, G, and B. The CPU 200 computes a representative color Fc from the created histograms of the ornamental image data FD (step S130). The concrete procedure reads medians of the respective color components R, G, and B from the created histograms and sets the combination of the medians to the representative color Fc (Rm,Gm,Bm) of the ornamental image data FD. One example of the representative color Fc(Rm,Gm,Bm) is shown in FIG. 7. The representative color Fc(Rm,Gm,Bm) may take values in a range of 0 to 255 in the case of 8-bit tone data. The median may be replaced by a mean value of each color component R, G, or B.

The CPU 200 analyzes the obtained image data GD and creates histograms of the image data GD (step S140). The concrete procedure scans the image data GD in units of pixels to acquire a statistical image value (characteristic value) representing a characteristic of the image data FD with regard to an image quality adjustment parameter. The image quality adjustment parameter may be, for example, the contrast, the sharpness, or the brightness. The procedure of this embodiment obtains the characteristic value with regard to a color balance-relating image quality adjustment parameter, that is, histograms of the respective color components R, G, and B.

The personal computer 20 stores in advance a preset reference value of the color balance-relating image quality adjustment parameter in the HDD 202. The CPU 200 sets a correction level of the color balance-relating image quality adjustment parameter, that is, an analyzed color balance correction level Gc(Ra,Ga,Ba), to cancel out or at least reduce a difference between the characteristic value and the preset reference value with regard to the color balance-relating image quality adjustment parameter (step S150).

When the image data GD is related to the image processing control information GI, the analyzed color balance correction level Gc may be set based on the image processing control information GI. When the image processing control information GI specifies a reduction rate of the difference between the characteristic value and the reference value of the color balance-relating image quality adjustment parameter, that is, a level of auto image quality adjustment, the analyzed color balance correction level Gc is set according to the reduction rate specified in the image processing control information GI, instead of a preset reduction rate. When the image processing control information. GI specifies a concrete setting of the color balance-relating image quality adjustment parameter, on the other hand, the setting is used as the analyzed color balance correction level Gc. The image processing control information GI gives the analyzed correction level reflecting the photographer's demand.

The CPU 200 computes a modified color balance correction level Mc(Rc,Gc,Bc) from the representative color Fc and the analyzed color balance correction level Gc (step S160) as described below in detail.

(1) In the Case of Rm>Gm, Bm (Rather Reddish Ornamental Image Data FD)

The procedure reads a modification rate k corresponding to a characteristic value I, which is obtained by Equation (1) given below, from the graph of FIG. 8 and modifies the color component R of the analyzed color balance correction level Gc(Ra,Ga,Ba) according to Equation (2) given below to set a modified color balance correction level Mc(Rc,Gc,Bc), where $0 \leq k \leq 0.4$:

$$I=(Rm-(Gm+Bm)/2)/Rm \quad (1)$$

$$Rc=Ra(1+k) \quad (2)$$

$$Mc(Rc,Gc,Bc)=(Ra(1+k),Ga,Ba)$$

Figure 9:
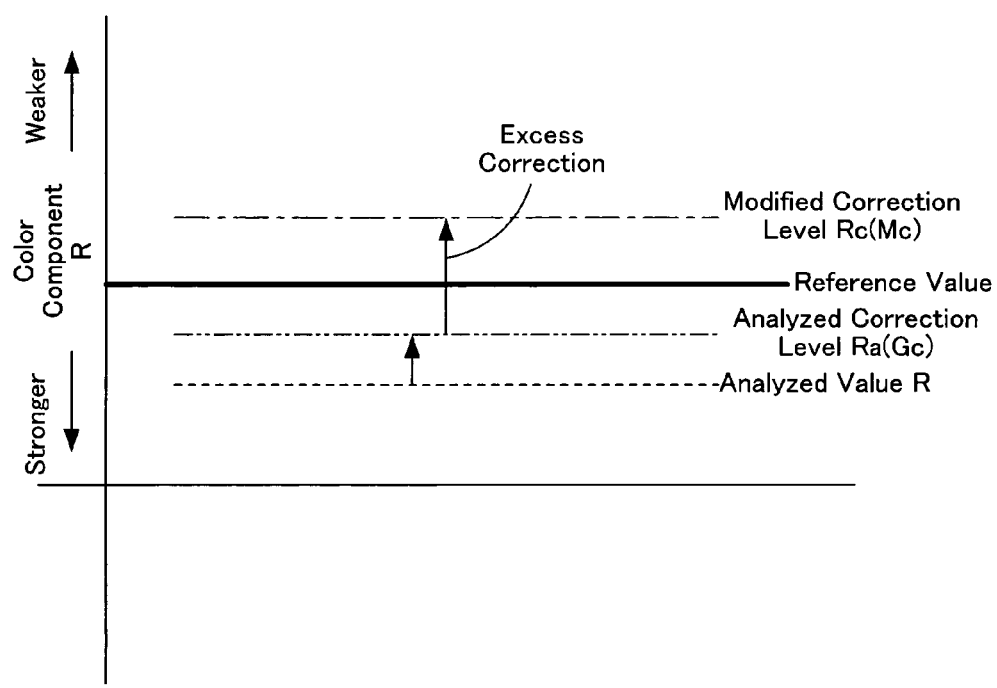
FIG. 9 shows a process of modifying an analyzed color balance correction level Gc in the first embodiment.

This modification causes slightly excess correction of the color component R and thereby gives a total color balance of the image data GD with the relatively weakened color component R (red component) and the relatively enhanced color components G and B. The modification technique is described more in detail with reference to FIG. 9. Under the condition of a relatively strong color component R, the procedure sets the analyzed color balance correction level Gc to weaken the color component R (to make the color component R approach to its standard level), while setting the correction levels of the other color components G and B to 0. Equation (2) given above enhances the analyzed color balance correction level Gc with regard to only the color component R to further weaken the color component R. This modification process accordingly enhances a color contrast between the image data GD and the rather reddish ornamental image data FD and gives a resulting output image including an objective image sufficiently highlighted against an ornamental image.

(2) In the Case of Gm>Rm, Bm (Rather Greenish Ornamental Image Data FD)

The procedure reads the modification rate k corresponding to a characteristic value I, which is obtained by Equation (3) given below, from the graph of FIG. 8 and modifies the color components R and B of the analyzed color balance correction level Gc(Ra,Ga,Ba) according to Equations (4) and (5) given below to set the modified color balance correction level Mc(Rc,Gc,Bc), where $0 \leq k \leq 0.4$:

$$I=(Gm-(Rm+Bm)/2)/Gm \quad (3)$$

$$Rc=Ra(1-k) \quad (4)$$

$$Bc=Ba(1-k) \quad (5)$$

$$Mc(Rc,Gc,Bc)=(Ra(1-k),Ga,Ba(1-k))$$

This modification reduces the correction levels of the color components R and B and thereby gives a total color balance of the image data GD with the relatively enhanced color components R and B and the relatively weakened color component G (green component). This modification process accordingly enhances a color contrast between the image data GD and the rather greenish ornamental image data FD and gives a resulting output image including an objective image sufficiently highlighted against an ornamental image.

(3) In the Case of Bm>Rm, Gm (Rather Bluish Ornamental Image Data FD)

The procedure reads the modification rate k corresponding to a characteristic value I, which is obtained by Equation (6) given below, from the graph of FIG. 8 and modifies the color component B of the analyzed color balance correction level Gc(Ra,Ga,Ba) according to Equation (7) given below to set the modified color balance correction level Mc(Rc,Gc,Bc), where $0 \leq k \leq 0.4$:

$$I=(Bm-(Rm+Gm)/2)/Bm \quad (6)$$

$$Bc=Ba(1+k)$$

$$Mc(Rc,Gc,Bc)=(Ra,Ga,Ba(1+k)) \quad (7)$$

This modification causes slightly excess correction of the color component B and thereby gives a total color balance of the image data GD with the relatively weakened color component B (blue component) and the relatively enhanced color components R and G. This modification process accordingly enhances a color contrast between the image data GD and the rather bluish ornamental image data FD and gives a resulting output image including an objective image sufficiently highlighted against an ornamental image.

The CPU 200 executes image quality adjustment of the image data GD with the modified color balance correction level Mc (step S170). For example, the image quality adjustment uses tone curves (S curves) that correlate input levels to output levels of the RGB color components of the image data GD. In the image quality adjustment with the tone curves, the modified color balance correction level Mc(Rc,GcBc) is used to vary (offset) the tone curves of the R, G, and B color components. A specific point for application of the modified correction level is set experimentally on each tone curve with regard to each image quality adjustment parameter. The modified color balance correction level Mc is applied as an offset of the output level of the color balance against a value '0' of the input level. This varies the value of the tone curve at the preset specific point and accordingly changes the input-output characteristic of the tone curve. Application of the corrected tone curves with regard to the respective color components R, G, and B to the image data GD makes the input-output conversion with regard to the respective color components R, G, and B of the image data GD and thereby gives the image quality-adjusted image data GD. It is preferable not to execute auto adjustment of the color balance in the case where the image processing control information GI specifies intentional color seepage. In the image quality adjustment process, the user may change the modified color balance correction level Mc(Rc,Gc,Bc), for example through the operation of the input device of the personal computer or the operation panel of the color printer 30.

The CPU 200 combines the image data GD with the ornamental image data FD according to the layout control information LI to generate resulting output image data (step S180). One typical method of combining the image data GD with the ornamental image data FD is described.

The CPU 200 interprets the script of the layout control information LI describing the layout locations and the layout dimensions, determines the locations and the dimensions of the image data GD to be laid out on the ornamental image data FD based on the result of the interpretation, specifies the tone values of the ornamental image data FD according to the α channel data, and combines the image data GD with the ornamental image data FD. The CPU 200 resizes (contracts or expands) the dimensions of the image data GD according to the layout dimensions of the respective layout locations described in the script.

The CPU 200 applies the α channel data and sums up the R, G, and B values of the respective image data to calculate the R, G, and B values of resulting output image data. The α channel data is set equal to 0 to prevent interference of the ornamental image data FD with reproduction of the image data GD in the area of an image in a resulting output image (composite image). The a channel data is set equal to 255 to prohibit reproduction of the image data GD in the area of an ornamental image (an ornamental area or a frame area) in the resulting output image.

The CPU 200 outputs resulting output image data to a printer driver or a display driver (step S190) and terminates this image processing routine. The printer driver executes RGB to CMYK color conversion based on lookup tables, halftoning, and other required series of image processing and eventually sends the output image data with print control commands as raster data to the printer 30.

As described above, the personal computer 20 as the image processing device of the first embodiment reads the total color tendency of the ornamental image data FD from the color distribution of the ornamental image data FD and modifies the analyzed color balance correction level Gc, which is obtained by analysis of the image data GD to be laid out on the ornamental image data FD, based on the color tendency, so as to set the modified color balance correction level Mc. The modified color balance correction level Mc is set to make the color (color tendency) of the image data GD different from the color (color tendency) of the ornamental image data FD. Such setting enhances the color contrast between an objective image and an ornamental image included in a resulting output image and makes the objective image sufficiently highlighted against the ornamental image.

In the first embodiment described above, the CPU 200 sets the analyzed color balance correction level Gc according to the result of the analysis of the image data GD, modifies the analyzed color balance correction level Gc to the modified color balance correction level Mc based on the representative color Fc of the ornamental image data FD, and executes image quality adjustment with the modified color balance correction level Mc. The single image quality adjustment is thus sufficiently executed by taking into account both the characteristic of the image data GD and the color distribution of the ornamental image data FD. This arrangement desirably shortens the processing time required for image quality adjustment without deteriorating the image quality of the processed image data GD.

The procedure of the first embodiment determines the color distribution or the representative color Fc of the ornamental image data FD by analysis of the ornamental image data FD. Representative color information included in the layout control information LI as shown in FIG. 5 may be used as the representative color Fc. The layout control information LI may additionally include the modification rate k. The procedure then does not require the analysis of the ornamental image data FD and thus accelerates the image quality adjustment of the image data GD based on the color characteristic of the ornamental image data FD.

Modified Examples (1) The procedure of the first embodiment executes image quality adjustment of the image data GD with regard to only the color balance. The image quality adjustment may also be executed with diversity of other image quality adjustment parameters, for example, the shadowing, the highlighting, the brightness, the contrast, and the memory color correction. The image quality adjustment uses tone curves (S curves) that correlate input levels to output levels of the RGB color components of the image data GD with regard to the respective image quality adjustment parameters. A specific point for application of the modified correction level is set experimentally on each tone curve with regard to each image quality adjustment parameter. The modified correction level varies the value of the tone curve at the preset specific point and accordingly changes the input-output characteristic of the tone curve. Application of the corrected tone curves with regard to the respective color components R, G, and B to the image data GD makes the input-output conversion with regard to the respective color components R, G, and B of the image data GD and thereby gives the image quality-adjusted image data GD.

(2) The procedure of the first embodiment sets the analyzed color balance correction level Gc, sets the modified color balance correction level Mc by reflecting the representative color Fc of the ornamental image data FD, and executes image quality adjustment of the image data GD with the modified color balance correction level Mc.

One modified procedure may execute first image quality adjustment of the ornamental image data GD with the analyzed color balance correction level Gc to standardize the image data GD and subsequently execute second image quality adjustment of the standardized image data GD based on the representative color Fc of the ornamental image data FD. This modified procedure makes the image quality of the image data GD equivalent to or approximate to the standard value and then executes the image quality adjustment based on the color distribution of the ornamental image data FD.

Second Embodiment

Figure 10:
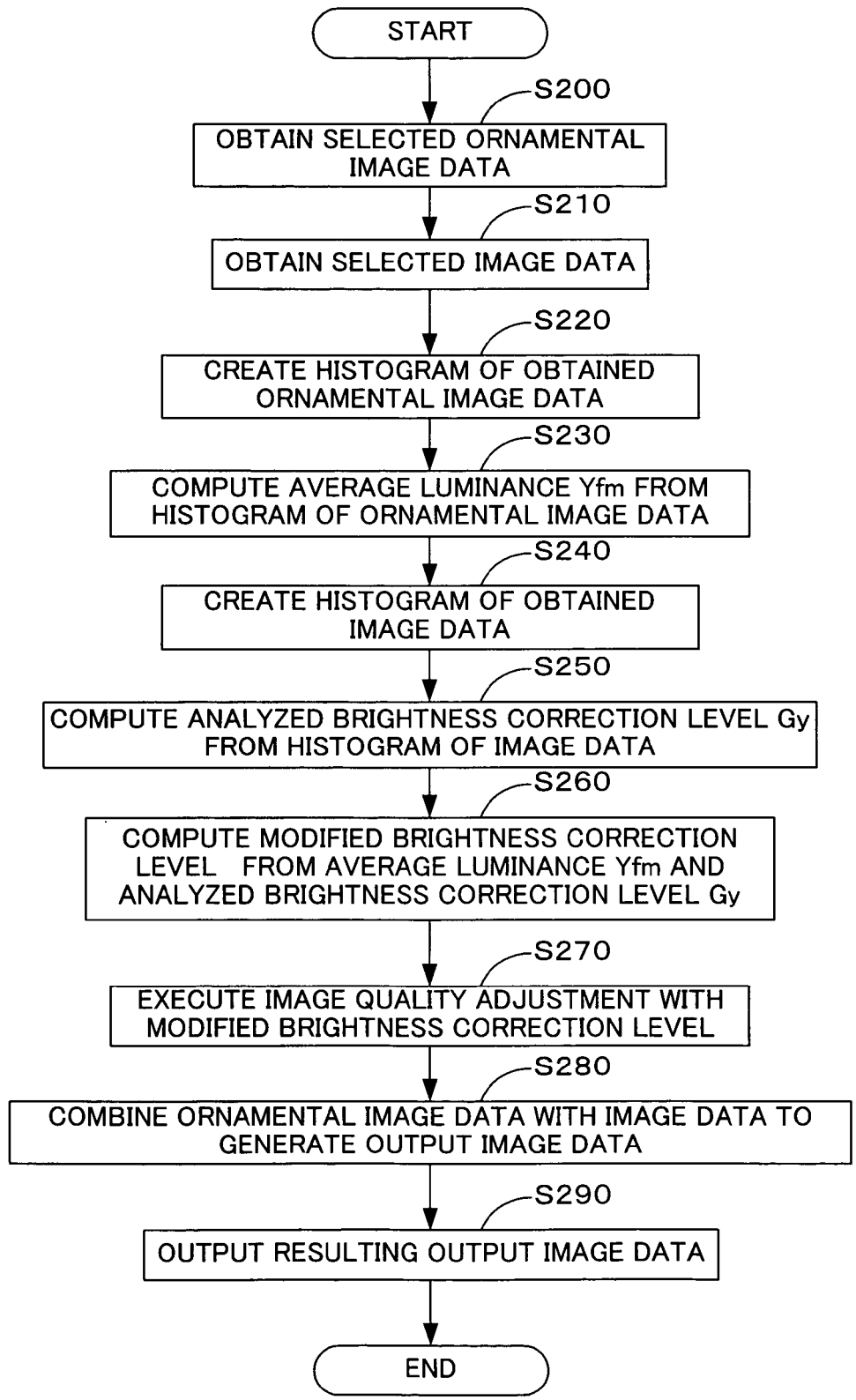
FIG. 10 is a flowchart showing an image processing routine executed by the personal computer 20 in a second embodiment of the invention.
Figure 11:
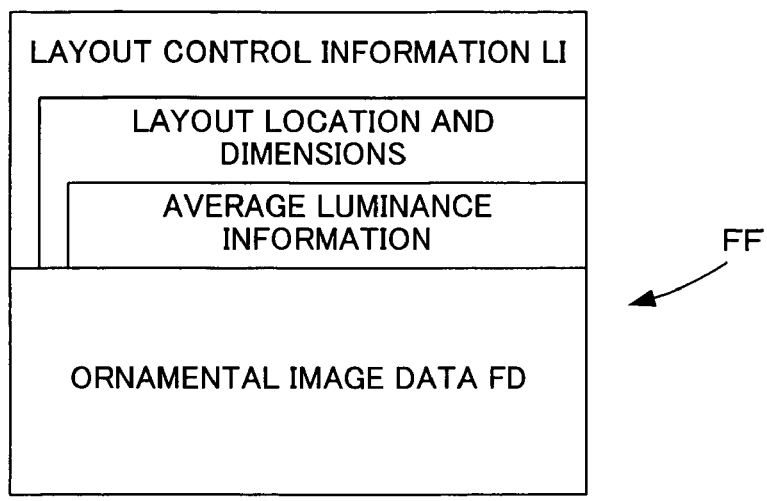
FIG. 11 shows the file structure of an ornamental image file FF including ornamental image data FD and layout control information LI.
Figure 12:
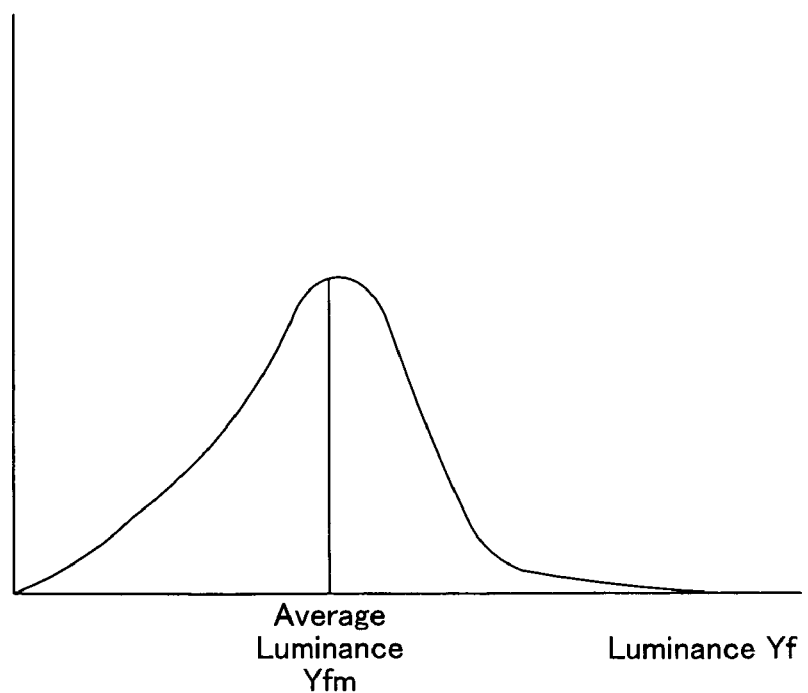
FIG. 12 shows a luminance characteristic curve obtained by analyzing the ornamental image data FD.
Figure 13:
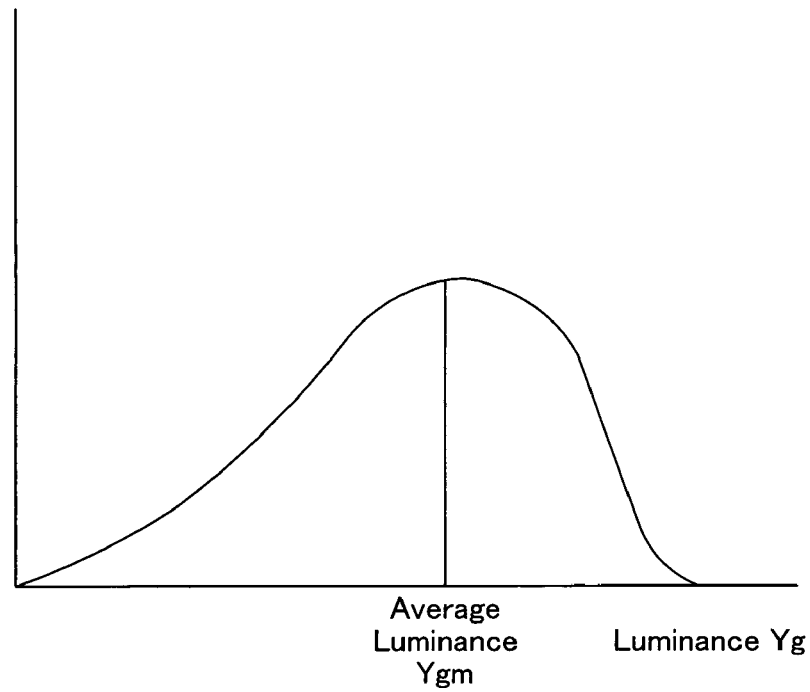
FIG. 13 shows a luminance characteristic curve obtained by analyzing the image data GD.
Figure 14:
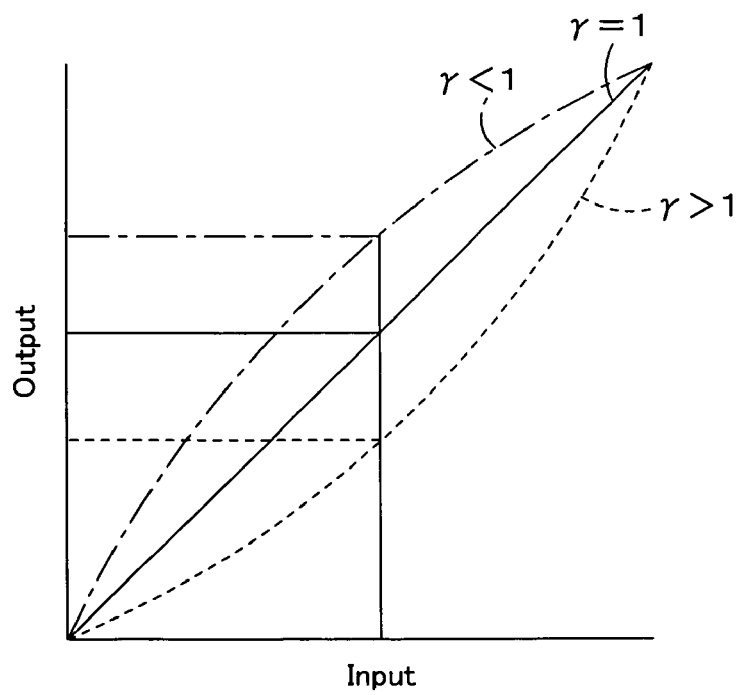
FIG. 14 shows variations in output value against input value of modified brightness correction level $\gamma$.

A series of image processing executed by the personal computer 20 in a second embodiment of the invention is described with reference to FIGS. 10 through 14. FIG. 10 is a flowchart showing an image processing routine executed by the personal computer 20 in the second embodiment. FIG. 11 shows the file structure of an ornamental image file FF including ornamental image data FD and layout control information LI. FIG. 12 shows a luminance characteristic curve obtained by analyzing the ornamental image data FD. FIG. 13 shows a luminance characteristic curve obtained by analyzing the image data GD. FIG. 14 shows variations in output value against input value of modified brightness correction level $\gamma$. The image of the ornamental image data FD conceptually shows the state of expansion on an image buffer. The file structure of each file conceptually shows the state of storage in a memory. The structure of the image processing device (personal computer) in the second embodiment is identical with the structure of the image processing device of the first embodiment. The like elements are thus expressed by the like numerals and are not specifically described here.

The series of image processing executed in the second embodiment is described with reference to FIG. 10. The image processing of this embodiment may be activated by insertion of the memory card MC into the personal computer 20 or by connection of the digital still camera 10 to the personal computer 20 via the communication cable. The image processing may otherwise be triggered by the user's operation of a keyboard to give a start command.

When the image processing starts, the personal computer 20 (CPU 200) first selects ornamental image data FD and temporarily stores the selected ornamental image data FD in the RAM 201 (step S200). The ornamental image data FD may be selected on the digital still camera 10, may be selected among a number of ornamental image data stored in advance in the HDD 202 of the personal computer 20 through the operations of the keyboard, or may be selected via a network. The ornamental image data FD may include plural layout locations to paste multiple image data GD thereon. In this embodiment, however, for the simplicity of explanation, it is assumed that single (one) image data GD is pasted on ornamental image data FD having only one layout location.

The ornamental image data FD has, for example, a form shown in FIG. 4 in a resulting output image (in expansion on an image buffer). The ornamental image data FD has one or multiple layout locations, on which image data GD are respectively pasted.

The ornamental image data FD is transmitted together with the layout control information LI in the form of an ornamental image file FF. The ornamental image file FF has, for example, the file structure of FIG. 11. The layout control information LI includes layout location information (for example, coordinate information) on the layout location to paste image data GD thereon, information regarding the layout dimensions (resized dimensions) of the image data GD on the layout location, and average luminance information (luminance distribution characteristic information) of the ornamental image data FD.

The layout control information LI further includes a channel data, which is used to regulate tone values (R, G, and B tone data) of upper image data (for example, ornamental image data FD) located on an upper side in a resulting composite image relative to those of lower image data (for example, image data GD) located on a lower side and thereby determine the transparency of the lower image data against the upper image data. For example, the a channel data applies a coefficient α to the R, G, and B tone data of the upper image data, while applying a coefficient (1−α) to the R, G, and B tone data of the lower image data. The α channel data set equal to 255 shows no appearance of the lower image data (opaque) in a resulting composite image, whereas the α channel data set equal to 0 shows perfect appearance of the lower image data (transparent) in a resulting composite image. Semi-transparent design effects are given by setting the α channel data in a range of 0 to 255.

The CPU 200 then selects desired image data GD and temporarily stores the selected image data GD into the RAM 201 (step S210). The image data GD may be selected on the digital still camera 10 or on the personal computer 20 through the operations of the keyboard. The typical procedure first selects (determines) desired ornamental image data FD and subsequently selects desired image data to be pasted in the layout location of the ornamental image data GD.

Each image data GD may be related to image processing control information GI to form one image file GF as shown in FIG. 6. The image processing control information GI may be described in a header of the image data GD or may be related to the image data GD by third correlation data.

The CPU 200 analyzes the obtained ornamental image data FD and creates a histogram of luminance characteristic of the ornamental image data FD (step S220). The concrete procedure scans multiple pixel data of the ornamental image data FD in units of pixels or at adequate pixel intervals and creates a histogram of a luminance component. The CPU 200 computes an average luminance Yfm from the histogram of the ornamental image data FD (step S230). The concrete procedure reads a median of a luminance value Yf from the histogram. One example of the histogram and the average luminance Yfm is shown in FIG. 12. The average luminance Yfm may take a value in a range of 0 to 255 in the case of 8-bit tone data. The median may be replaced by a mean value of the respective pixel data.

The CPU 200 analyzes the obtained image data GD and creates a histogram of the luminance characteristic of the image data GD (step S240). The concrete procedure scans the image data GD in units of pixels to acquire a statistical image value (characteristic value) representing a characteristic of the image data FD with regard to an image quality adjustment parameter. The image quality adjustment parameter may be, for example, the contrast, the sharpness, or the color balance. The procedure of this embodiment obtains the characteristic value with regard to a brightness-relating image quality adjustment parameter, that is, a histogram of the luminance component.

The personal computer 20 stores in advance a preset reference value of the brightness-relating image quality adjustment parameter in the HDD 202. The CPU 200 sets a correction level of the brightness-relating image quality adjustment parameter, that is, an analyzed brightness correction level (correction coefficient) Gy, to cancel out or at least reduce a difference between the characteristic value and the preset reference value with regard to the brightness-relating image quality adjustment parameter (step S250). The analyzed brightness correction level Gy is calculated according to an equation given below from an average luminance Ygm of the image data GD, which is obtained from the histogram of FIG. 13, where Ys denotes the reference value of the brightness-relating image quality adjustment parameter:

$$Gy=Ygm/Ys$$

When the image data GD is related to the image processing control information GI, the analyzed brightness correction level Gy may be set based on the image processing control information GI. When the image processing control information GI specifies a reduction rate of the difference between the characteristic value and the reference value of the brightness-relating image quality adjustment parameter, that is, a level of auto image quality adjustment, the analyzed brightness correction level Gy is set according to the reduction rate specified in the image processing control information GI, instead of a preset reduction rate. When the image processing control information GI specifies a concrete setting of the brightness-relating image quality adjustment parameter, on the other hand, the setting is used as the analyzed brightness correction level Gy, regardless of the result of the analysis of the image data GD. The image processing control information GI gives the analyzed correction level reflecting the photographer's demand.

The CPU 200 computes a modified brightness correction level (correction coefficient) γ from the average luminance Yfm and the analyzed brightness correction level Gy according to Equations (8) and (9) given below (step S260):

$$DY=(Yfm-Th)*k \quad (8)$$

$$\gamma=Gy+DY/Th \quad (9)$$

where Th denotes a threshold value for determining the brightness of the ornamental image data FD and k denotes a constant. The luminance contrast increases with an increase in constant k.

The modification technique increases the modified brightness correction level γ under the condition of Yfm>Th, that is, in the case of bright ornamental image data FD. This decreases the output level against the input level as shown in FIG. 14 to darken the image data GD. The modification technique decreases the modified brightness correction level γ, on the other hand, under the condition of Yfm<Th, that is, in the case of dark ornamental image data FD. This increases the output level against the input level as shown in FIG. 14 to brighten the image data GD.

The CPU 200 executes image quality adjustment of the image data GD with the modified brightness correction level γ (step S270). For example, the image quality adjustment uses a tone curve (S curve) that correlates the input level to the output level of each of the RGB color components of the image data GD. An identical tone curve is applied to the respective color components R, G, and B:

$$R'=(R/255)^\gamma$$

$$G'=(G/255)^\gamma$$

$$B'=(B/255)^\gamma$$

This makes the input-output conversion with regard to the respective color components R, G, and B of the image data GD and thereby gives the image quality-adjusted image data GD. The modified brightness correction level γ greater than the analyzed brightness correction level Gy gives the lower output level against the input level and thereby decreases (lowers) the brightness of the image data GD. There is accordingly a high luminance contrast between the bright ornamental image data FD and the relatively dark image data GD. In a resulting output image, an objective image is not merged into an ornamental image but is sufficiently highlighted against the ornamental image.

The modified brightness correction level γ less than the analyzed brightness correction level Gy, on the other hand, gives the higher output level against the input level and thereby increases (heightens) the brightness of the image data GD. There is accordingly a high luminance contrast between the dark ornamental image data FD and the relatively bright image data GD. In a resulting output image, an objective image is not merged into an ornamental image but is sufficiently highlighted against the ornamental image. In the image quality adjustment process, the user may change the modified brightness correction level γ, for example through the operation of the input device of the personal computer or the operation panel of the color printer 30.

On completion of the image quality adjustment of the image data GD with regard to the brightness, the CPU 200 combines the image data GD with the ornamental image data FD according to the layout control information LI to generate resulting output image data (step S280). One typical method of combining the image data GD with the ornamental image data FD is described.

The CPU 200 interprets the script of the layout control information LI describing the layout locations and the layout dimensions, determines the locations and the dimensions of the image data GD to be laid out on the ornamental image data FD based on the result of the interpretation, specifies the tone values of the ornamental image data FD according to the α channel data, and combines the image data GD with the ornamental image data FD. The CPU 200 resizes (contracts or expands) the dimensions of the image data GD according to the layout dimensions of the respective layout locations described in the script.

The CPU 200 applies the α channel data and sums up the R, G, and B values of the respective image data to calculate the R, G, and B values of resulting output image data. The α channel data is set equal to 0 to prevent interference of the ornamental image data FD with reproduction of the image data GD in the area of an image in a resulting output image (composite image). The α channel data is set equal to 255 to prohibit reproduction of the image data GD in the area of an ornamental image (an ornamental area or a frame area) in the resulting output image.

The CPU 200 outputs resulting output image data to a printer driver or a display driver (step S290) and terminates this image processing routine. The printer driver executes RGB to CMYK color conversion based on lookup tables, halftoning, and other required series of image processing and eventually sends the output image data with print control commands as raster data to the printer 30.

As described above, the personal computer 20 as the image processing device of the second embodiment reads the brightness tendency of the ornamental image data FD from the luminance distribution of the ornamental image data FD and modifies the analyzed brightness correction level Gy, which is obtained by analysis of the image data GD to be laid out on the ornamental image data FD, based on the brightness tendency, so as to set the modified brightness correction level γ. The modified brightness correction level γ is set to make the luminance (brightness tendency) of the image data GD different from the luminance (brightness tendency) of the ornamental image data FD. Such setting enhances the luminance contrast between an objective image and an ornamental image included in a resulting output image and makes the objective image sufficiently highlighted against the ornamental image.

In the second embodiment described above, the CPU 200 sets the analyzed brightness correction level Gy according to the result of the analysis of the image data GD, modifies the analyzed brightness correction level Gy to the modified brightness correction level γ based on the average luminance Yfm of the ornamental image data FD, and executes image quality adjustment with the modified brightness correction level γ. The single image quality adjustment is thus sufficiently executed by taking into account both the characteristic of the image data GD and the luminance of the ornamental image data FD. This arrangement desirably shortens the processing time required for image quality adjustment without deteriorating the image quality of the processed image data GD.

The procedure of the second embodiment determines the luminance characteristic or the average luminance Yfm of the ornamental image data FD by analysis of the ornamental image data FD. Average luminance information included in the layout control information LI as shown in FIG. 5 may be used as the average luminance Yfm. The layout control information LI may additionally include a modification rate DY/Th. The procedure then does not require the analysis of the ornamental image data FD and thus accelerates the image quality adjustment of the image data GD based on the luminance characteristic of the ornamental image data FD.

Modified Examples (1) The procedure of the second embodiment executes image quality adjustment of the image data GD with regard to only the brightness. The image quality adjustment may also be executed with diversity of other image quality adjustment parameters, for example, the shadowing, the highlighting, the contrast, the color balance, and the memory color correction. The image quality adjustment uses tone curves (S curves) that correlate input levels to output levels of the RGB color components of the image data GD with regard to the respective image quality adjustment parameters. A specific point for application of the modified correction level is set experimentally on each tone curve with regard to each image quality adjustment parameter. The modified correction level varies the value of the tone curve at the preset specific point and accordingly changes the input-output characteristic of the tone curve. Application of the corrected tone curves with regard to the respective color components R, G, and B to the image data GD makes the input-output conversion with regard to the respective color components R, G, and B of the image data GD and thereby gives the image quality-adjusted image data GD.

(2) The procedure of the second embodiment sets the analyzed brightness correction level Gy, sets the modified brightness correction level γ by reflecting the average luminance Yfm of the ornamental image data FD, and executes image quality adjustment of the image data GD with the modified brightness correction level γ.

One modified procedure may execute first image quality adjustment of the ornamental image data GD with the analyzed brightness correction level Gy to standardize the image data GD and subsequently execute second image quality adjustment of the standardized image data GD based on the average luminance Yfm of the ornamental image data FD. This modified procedure makes the image quality of the image data GD equivalent to or approximate to the standard value and then executes the image quality adjustment based on the average luminance Yfm of the ornamental image data FD.

Modifications

The procedure of the first embodiment varies the modification rate k according to the color distribution characteristic of the ornamental image data FD, that is, the magnitudes of the respective color components of the representative color Fc. The modified color balance correction level Mc may be set by fixing the modification rate k equal to 0.2.

The procedure of the first embodiment modifies the analyzed color balance correction level Gc and sets the modified color balance correction level Mc to enhance the color contrast between an objective image and an ornamental image in a resulting output image. One possible modification may set the modified color balance correction level Mc to lower the color contrast between the objective image and the ornamental image in the resulting output image. This modification is attained by setting a negative value to the modification rate k in Equations (2), (4), (5), and (7) given above. This attains a highly harmonized color balance of an objective image with an ornamental image and gives the objective image in good harmony with the ornamental image in a resulting output image.

The procedure of the first embodiment executes auto image quality adjustment, which analyzes the image data GD and makes the characteristic value of the image data GD equal to or approximate to the preset reference value with regard to the selected image quality adjustment parameter. One possible modification may execute only image quality adjustment based on the representative color Fc of the ornamental image data FD, instead of the auto image quality adjustment. This modified image quality adjustment does not use the analyzed color balance correction level Gc but simply applies the representative color Fc. The modified procedure also enhances the color contrast between an objective image and an ornamental image in a resulting output image.

The above description of the embodiments is on the assumption that only one image data GD is laid out on one ornamental image data FD. One or multiple image data GD may be laid out on one or multiple ornamental image data FD. In such cases, the image quality adjustment process described above is executed for the one or multiple image data GD pasted on each ornamental image data FD.

The representative color Fc or the modification rate k computed in the first embodiment may be written as part of the layout control information LI related to the ornamental image data FD.

The procedure of the second embodiment uses the coefficients to be applied to the equation representing the characteristic line of the tone curve as the analyzed brightness correction level Gy and the modified brightness correction level γ. The analyzed brightness correction level Gy and the modified brightness correction level γ may otherwise be the values of specifying offsets of the tone curve. Each tone curve has a specific point determined experimentally for an offset (correction level) with regard to each image quality adjustment parameter. For example, the input-output characteristic of a brightness-relating tone curve is varied by raising a ¼ point of the input level by the modified brightness correction level γ for the brightening effect and by lowering a ¾ point of the input level by the modified brightness correction level γ for the darkening effect.

The procedure of the second embodiment modifies the analyzed brightness correction level Gy and sets the modified brightness correction level γ to enhance the luminance contrast between an objective image and an ornamental image in a resulting output image. One possible modification may set the modified brightness correction level γ to lower the luminance contrast between the objective image and the ornamental image in the resulting output image. This modification is attained by setting a negative value to the modification rate k in Equation (8) given above. This attains a highly harmonized luminance or brightness tendency of an objective image and an ornamental image and gives the objective image in good harmony with the ornamental image in a resulting output image.

The procedure of the second embodiment executes auto image quality adjustment, which analyzes the image data GD and makes the characteristic value of the image data GD equal to or approximate to the preset reference value with regard to the selected image quality adjustment parameter. One possible modification may execute only image quality adjustment based on the average luminance Yfm of the ornamental image data FD, instead of the auto image quality adjustment. This modified image quality adjustment does not use the analyzed brightness correction level Gy but simply applies a preset correction level (correction coefficient) corresponding to the average luminance Yfm. The modified procedure also enhances or lowers the luminance contrast between an objective image and an ornamental image in a resulting output image.

The above description of the embodiments is on the assumption that only one image data GD is laid out on one ornamental image data FD. One or multiple image data GD may be laid out on one or multiple ornamental image data FD. In such cases, the image quality adjustment process described above is executed for the one or multiple image data GD pasted on each ornamental image data FD.

The average luminance Yfm or the modification rate DY/Th computed in the second embodiment may be written as part of the layout control information LI related to the ornamental image data FD.

In the embodiments discussed above, the personal computer 20 is adopted as the image processing device to execute the series of image processing. The image processing device is, however, not restricted to the personal computer but may be, for example, a standalone printer or a standalone display device having the image processing functions to execute the series of image processing. The technique of the invention is also attained by a printer driver, a video driver, and an image processing application program without the hardware configuration of the image processing device. Available examples of the display device include CRTs, liquid crystal displays, and projectors that have the image quality adjustment function with regard to image data and are capable of displaying a resulting output image according to the quality-adjusted image data GD.

All or part of the image processing may be executed by the digital still camera 10, in place of the personal computer PC. In this case, the image processing functions discussed in any of the first and the second embodiments and their modified examples are added to an image data processing application program, for example, a retouch application program or a printer driver stored in a ROM of the digital still camera 10. Print data, which include print image data and print control commands and are generated by the digital still camera 10, are given to the printer 30 via the cable or via the memory card MC. The printer 30 receives the print data and creates a dot pattern on a printing medium according to the received print image data to output a printed image. The digital still camera 10 may alternatively give output image data (processed image data) to the personal computer 20 or the printer 30. The personal computer 20 or the printer 30 then generates print data including print control commands.

In the above embodiments, the series of image processing are executed by the image processing software or the computer programs. The image processing may alternatively be attained by an image processing hardware circuit including logic circuits of respective processing steps. This modified structure relieves the process load of the CPU 200 and ensures the higher-speed image processing. The image processing hardware circuit is mounted, for example, as a packaged circuit in the digital still camera 10 and the printer 30 or as an add-on card in the personal computer 20.

The image processing device, the image processing method, and the image processing program of the invention are described in detail with reference to some embodiments. These embodiments discussed above are, however, to be considered in all aspects as illustrative and not restrictive. There may be many modifications, changes, and alterations without departing from the scope or spirit of the main characteristics of the present invention. All changes within the meaning and range of equivalency of the claims are intended to be embraced therein.

The following Japanese patent applications as the basis of the priority claim of this application are incorporated in the disclosure hereof by reference:
Japanese Patent Application No. 2003-316125 (filing date: Sep. 9, 2003); and
Japanese Patent Application No. 2003-316897 (filing date: Sep. 9, 2003).

What is claimed is:

1. An image processing device that executes image processing of objective image data, which is to be laid out on ornamental image data, said image processing device comprising:
    an ornamental image data acquisition module that obtains the ornamental image data;
    an objective image data acquisition module that obtains the objective image data, wherein the objective image data is to be laid out on a layout location of the ornamental image data;
    a layout control information acquisition module that obtains layout control information, wherein the layout control information is related to the obtained ornamental image data and specifies a layout location and layout dimensions of the objective image data to be laid out on the ornamental image data and includes a representative color of the ornamental image data;
    an ornamental image color distribution characteristic acquisition module that acquires the representative color of the ornamental image data from the layout control information;
    an analyzed correction level setting module that analyzes the objective image data, which is to be laid out on the ornamental image data, obtains an analyzed color balance, and sets an analyzed correction level relating to the color balance, wherein the analyzed correction level relating to the color balance is a correction level to decrease or cancel a difference between the analyzed color balance and a predetermined color balance;
    a modified color balance correction level setting module that modifies the analyzed correction level based on the acquired representative color so as to enhance a color contrast between the ornamental image data and the objective image data, and sets a modified color balance correction level, wherein the modified color balance correction level is determined by specifying a representative color component from one of R, G, B components for the representative color and increasing correction level for the specified representative color component so as to decrease level of the representative color component in the objective image data;
    an image quality adjustment module that adjusts a color balance of the objective image data to enhance a color contrast between the ornamental image data and the objective image data, based on the modified color balance correction level; and
    an output image data generation module that generates output image data from the color balance-adjusted objective image data and the ornamental image data according to the layout control information.

2. An image processing device in accordance with claim 1, wherein said ornamental image color distribution characteristic acquisition module analyzes the ornamental image data to acquire the representative color of the ornamental image data.

3. An image processing method that executes image processing of objective image data, which is to be laid out on ornamental image data, said image processing method comprising:
    obtaining the ornamental image data;
    obtaining the objective image data, wherein the objective image data is to be laid out on a layout location of the ornamental image data;
    obtaining layout control information, wherein the layout control information is related to the obtained ornamental image data and specifies a layout location and layout dimensions of the objective image data to be laid out on the ornamental image data and includes a representative color of the ornamental image data;
    acquiring the representative color of the ornamental image data from the layout control information;
    analyzing the objective image data, which is to be laid out on the ornamental image data, obtaining an analyzed color balance, and setting an analyzed correction level relating to the color balance, wherein the analyzed correction level relating to the color balance is a correction level to decrease or cancel a difference between the analyzed color balance and a predetermined color balance;
    modifying the analyzed correction level based on the acquired representative color so as to enhance a color contrast between the ornamental image data and the objective image data, and sets a modified color balance correction level, wherein the modified color balance correction level is determined by specifying a representative color component from one of R, G, B components for the representative color and increasing correction level for the specified representative color component so as to decrease level of the representative color component in the objective image data;
    adjusting a color balance of the objective image data to enhance a color contrast between the ornamental image data and the objective image data, based on the modified color balance correction level; and
    generating output image data from the color balance-adjusted objective image data and the ornamental image data according to the layout control information.

4. An image processing device that executes image processing of objective image data, which is to be laid out on ornamental image data, said image processing device comprising:

an ornamental image data acquisition module that obtains the ornamental image data;

an objective image data acquisition module that obtains the objective image data, wherein the objective image data is to be laid out on a layout location of the ornamental image data;

a layout control information acquisition module that obtains layout control information, wherein the layout control information is related to the obtained ornamental image data and specifies a layout location and layout dimensions of the objective image data to be laid out on the ornamental image data and includes an average luminance of the ornamental image data;

an ornamental image luminance characteristic acquisition module that acquires the average luminance of the ornamental image data from the layout control information;

an analyzed correction level setting module that analyzes the objective image data, which is to be laid out on the ornamental image data, obtains an analyzed brightness, and sets an analyzed correction level relating to the brightness, wherein the analyzed correction level relating to the brightness is a correction level to decrease or cancel a difference between the analyzed brightness and a predetermined brightness;

a modified brightness correction level setting module that modifies the analyzed correction level based on the acquired average luminance, so as to enhance a color contrast between the ornamental image data and the objective image data, and sets a modified brightness correction level, wherein the modified brightness correction level is determined by calculating a luminance difference between the average luminance and a threshold luminance for the ornamental image data and adding the luminance difference to the analyzed correction level;

an image quality adjustment module that adjusts a brightness of the objective image data to enhance a luminance contrast between the ornamental image data and the objective image data, based on the acquired luminance characteristic; and an output image data generation module that generates output image data from the brightness-adjusted objective image data and the brightness of the objective image data with the modified brightness correction level.

5. An image processing device in accordance with claim 4, wherein said ornamental image luminance characteristic acquisition module analyzes the ornamental image data to acquire the average luminance of the ornamental image data.

6. An image processing method that executes image processing of objective image data, which is to be laid out on ornamental image data, said image processing method comprising:

obtaining the ornamental image data;

obtaining the objective image data, wherein the objective image data is to be laid out on a layout location of the ornamental image data;

obtaining layout control information, wherein the layout control information is related to the obtained ornamental image data and specifies a layout location and layout dimensions of the objective image data to be laid out on the ornamental image data and includes an average luminance of the ornamental image data;

acquiring the average luminance of the ornamental image data from the layout control information;

analyzing the objective image data, which is to be laid out on the ornamental image data, obtaining an analyzed brightness, and setting an analyzed correction level relating to the brightness, wherein the analyzed correction level relating to the brightness is a correction level to decrease or cancel a difference between the analyzed brightness and a predetermined brightness;

modifying the analyzed correction level based on the acquired average luminance, so as to enhance a color contrast between the ornamental image data and the objective image data, and setting a modified brightness correction level, wherein the modified brightness correction level is determined by calculating a luminance difference between the average luminance and a threshold luminance for the ornamental image data and adding the luminance difference to the analyzed correction level;

adjusting a brightness of the objective image data to enhance a luminance contrast between the ornamental image data and the objective image data, based on the brightness of the objective image data with the modified brightness correction level; and generating output image data from the brightness-adjusted objective image data and the ornamental image data according to the layout control information.

* * * * *